United States Patent Office 3,403,188
Patented Sept. 24, 1968

3,403,188
STABILIZATION OF PHENOLS
Hans L. Schlichting, Grand Island, and Ellis I. Lichtblau, Kenmore, N.Y., assignors to Hooker Chemical Corporation, Niagara Falls, N.Y., a corporation of New York
No Drawing. Filed Nov. 30, 1965, Ser. No. 510,702
13 Claims. (Cl. 260—621)

ABSTRACT OF THE DISCLOSURE

A polybasic acid of phosphorus and an organic acid selected from an aromatic ortho-hydroxycarboxylic acid of the formula

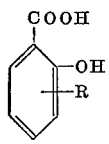

where R is selected from the group consisting of hydrogen, alkyl of one to five carbon atoms, and carboxyl groups, and a saturated aliphatic polycarboxylic acid containing from two to ten carbon atoms and from two to three carboxyl groups, each acid in the combination of said acids present being in a stabilizing proportion, can be used to stabilize phenol, halophenols, alkylphenols, and related products against deterioration in color and odor with age. A synergistic effect is suggested.

---

This invention relates to the stabilization of phenol ($C_6H_5OH$), halophenols, alkylphenols, and related products. More particularly, this invention relates to a process for improving the resistance of said compounds against deterioration in color and odor with age and to compounds effective as stabilizers for them.

It is well known that phenols, though carefully purified, tend to discolor on exposure to air. This discoloration, also often accompanied by an unpleasant odor, is chemically an oxidation reaction which is catalytically accelerated by light and various trace impurities. The reaction mechanism of autoxidation reactions of phenols to quinones and other colored products is complicated, involving radicals, ions, and ionic radicals as well.

Numerous compounds have been claimed as effective inhibitors of deterioration in color and odor. The compounds hitherto known as stabilizers for phenols may effectively inhibit one (or maybe more) reaction path(s) in the complex autoxidation reaction, but not all of the possible paths. For instance, phosphoric acid as a commonly known stabilizer (U.S. 2,752,398) inhibits a discoloration of a phenol which is accelerated by contact with or exposure to metal surfaces, such as iron or steel, rust and/or other metal oxides. But, as illustrated later, the stabilization is less effective if the phenol is also exposed to air and/or sunlight and/or additional trace amounts of acids or alkalies. Other stabilizers, for instance, organic polybasic carboxylic acids (U.S. 2,672,485), or Schiff's bases (British 787,859), or amino acids (British 807,736), may inhibit more or less effectively a discoloration of a phenol which is accelerated by exposure to air and/or sunlight and/or additional trace amounts of acids or alkalies. But the stabilization is less effective (almost nil) if the phenol is also exposed to metal and/or metal oxides, as for instance steel, iron, rust, and so forth.

The basis of the present invention is the discovery of the correlation between certain agents and particular catalytic effects on the autoxidation reaction. From this, we have discovered a suitable combination of two or more agents, each effective either in the presence of acid-alkali, and/or UV-light, and/or iron dust/iron oxide, that will protect phenols against discoloration which would normally occur under practical manufacturing conditions. Surprisingly, although the mixture of agents is applied in comparative tests in the same concentration as either one of the components, the effectiveness appears to be clearly improved, suggesting a synergistic effect of the components acting together.

According to this invention, adding a stabilizing amount of a stabilizer-mix, comprising a phosphoric acid, that is, a polybasic acid of phosphorus, and an organic acid, added as such or as an aqueous solution to a phenol, preferably immediately after the phenol has been distilled, is highly effective in inhibiting a change in color of the phenol, even under extreme storage conditions, such as being held in a molten state and in iron or steel containers deliberately contaminated with caustic or acid and scale and rust. The phenol is also stable to being held in a molten state, exposed to the daily sunlight in glass containers, deliberately contaminated with caustic or acid and scale and rust.

Each agent is present in a stabilizing amount. The amount of the stabilizer-mix employed corresponds to between about 0.001 percent and about 0.5 percent, preferably between about 0.002 percent and about 0.02 percent by weight of the phenol. In any event, the total stabilizer-mix is present in a stabilizing proportion. This minute amount is surprisingly more effective over the entire range of conditions in inhibiting color formation in the phenol than any one of the stabilizers alone.

It has surprisingly been found that incorporation in the phenol of a mixture comprising a phosphoric acid and oxalic acid or citric acid or salicylic acid or hydroxyisophthalic acid (abbreviated herein as "HIP"), or a combination of these latter acids as the organic component, prevents more effectively color development in a phenol than the incorporation of either one of the components alone. We prefer to use phosphoric acid ($H_3PO_4$) in combination with an aromatic ortho-hydroxycarboxylic acid and a saturated aliphatic polycarboxylic acid, as is more fully described below. The polybasic acid of phosphorus component to be used in the stabilizer-mix is selected from orthophosphoric acid, metaphosphoric acid, pyrophosphoric acid, hypophosphoric acid, the polyphosphoric acids, such as the polymetaphosphoric acids $(HPO_3)_x$, the polyphosphoric acids of the pyrophosphoric acid type having the formula $H_{x+2}P_xO_{3x+1}$, where $x$ is at least 2 and generally 2 to 6, and the primary phosphonic acids of the formula

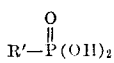

in which R' is an organic radical having from one to twelve carbon atoms linked to the phosphorus atom by a direct carbon-to-phosphorus bond. Also, other polyphosphoric acid may be used. More than one such acid may be used. We prefer to use phosphoric acid.

The organic acid component to be used in the stabilizer-mix is selected from aromatic ortho-hydroxycarboxylic acids and saturated aliphatic polycarboxylic acids. The aromatic ortho-hydroxycarboxylic acids are of the formula

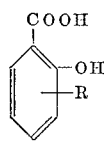

where R is selected from hydrogen, (saturated) alkyl of one to five carbon atoms, and carboxyl groups. Illustrative of these compounds are salicylic acid, 4-methylsalicylic acid, 4-tertiary butylsalicylic acid, hydroxyterephthalic acid and 4-hydroxyisophthalic acid; however, other acids within the defined formula may also be used. More than one such acid may be used.

The saturated aliphatic polycarboxylic acids contain from two to ten carbon atoms and are unsubstituted except in that they have from two to three carboxyl groups and may also contain one or more hydroxyl substituents. Illustrative of these compounds are tartaric acid, citric acid, malic acid, malonic acid, succinic acid, suberic acid, azelaic acid, glutaric acid, adipic acid, pimelic acid, sebacic acid, oxalic acid, glyceric acid, tartronic acid and the like acid. More than one such acid may be used. We prefer to use a mixture of citric acid and oxalic acid.

The components may normally be mixed in equal amounts by weight. However, different ratios may also be used according to the ratio of trace impurities to be expected.

Chelating agents may also be added in case of extended exposure to corroded iron surfaces, reducing the additional amounts of the polybasic phosphoric acid otherwise required. Suitable chelating agents are, for instance, ethylenediamine tetraacetate, or more preferably because of higher solubility, 1,2-diaminocyclohexane-N,N,N',N'-tetraacetic acid.

Phenols to be stabilized by the method of this invention include the monohydric phenols, for example phenol $(C_6H_5OH)$, its lower alkyl homologues, such as the isomeric cresols and xylenols, mono- and dibutylphenols, the isomeric amylphenols and the isomeric octylphenols, halophenols containing one to five halogen atoms, such as chlorophenol, bromophenol, dichlorophenols and dibromophenols, nonyl phenols, and so forth, fused ring phenols, such as the naphthols, methylene and alkylidene linked bisphenols as represented by 2,2'-, 2,4'-, and 4,4'-dihydroxydiphenylmethane, or 2,2-[4,4'-dihydroxydiphenyl]propane, and 1,2-[4,4'-dihydroxydiphenyl]ethylene, and the polyhydric phenols as typified by resorcinol, pyrogallol and hydroquinone. In other words, the phenols to be stabilized by this invention are selected from the group consisting of phenol, unsubstituted polyhydric monocyclic phenols, unsubstituted fused ring phenols, unsubstituted alkylidene linked bisphenols their lower alkyl derivatives and their halogenated derivatives.

Color measurement of commercial phenol is generally given by reference to the American Public Health Association (APHA) color scale, ranging, for intsance, from zero to 70. However, this scale is not sensitive enough to be used to measure the initial development of colored materials in phenol stored under various conditions. In our studies, as illustrated in the examples below, a conventional photometric technique, described for instance by W. West in Weissberger, "Technique of Organic Chemistry," vol. 1, Part 2, page 1399, Interscience Publisher Inc., New York, N.Y., 1949, was used because the first slightly colored compounds formed in phenol obey Beer's law. That is, for phenol the light absorption at the wave-length of 425 m$\mu$ is a function of the concentration of these compounds and the length of the sample cell. A light filter for this wavelength is standard equipment for most commercially available Electrophotometers. For other phenols, the most suitable wavelengths are somewhat different; however, at 425 m$\mu$ there is sufficient sensitivity for comparison purposes and since a color filter in this range is available, it was used in the electrophotometric measurements for those phenols as well.

Typical color stabilization effects obtained by incorporating the described mixture in a phenol are illustrated in the following examples which are not to be construed as limiting except as defined in the appended claims.

Example 1

Seventeen 940 gram (10 moles) portions of freshly distilled USP-grade phenol were melted and, except for a control portion, were mixed with the compounds listed in Table I and in the amounts for each compound. Mixtures (a)–(f) represent compositions according to this invention, while mixtures (g)–(p) are given for comparison purpose.

The outstanding color stabilizing effects of the stabilizer mixtures (a)–(f), according to the present invention, are readily apparent by the figures in the last column of Table I.

Four different 200 gram portions of the phenol mixtures (a)–(p) were taken out, after adding:

(1) None
(2) 4 milligrams NaOH (=20 parts per million)
(3) 4 milligrams HCl (=20 parts per million)
(4) 20 grams iron nails and 4 milligrams NaOH The samples were heated to about 100 degrees centigrade and exposed to ultraviolet light (sun lamp), while a slow stream of air was bubbled through the phenol. The formation of color was measured every hour by reading the percentage of light transmission at 425 m$\mu$ (electrophotometer) versus freshly distilled colorless phenol. The results for a reading after six hours, compared with unstabilized phenol as control, are summarized in Table I.

TABLE I.—PHENOL STABILIZATION

| Stabilizers | Percent light transmission at 425 mμ (6 hours) | | | | |
|---|---|---|---|---|---|
| | 1<br>O₂/UV | 2<br>O₂/UV/<br>NaOH | 3<br>O₂/UV/<br>HCl | 4<br>Fe/NaOH/<br>O₂/UV | Total 1-4 |
| None (control) | 30 | 20 | 25 | 10 | 85 |
| (a) 94 milligrams (0.01 percent by weight) of a mixture consisting of equal parts (by weight) of salicylic acid, oxalic acid and phosphoric acid | 93 | 75 | 75 | 75 | 318 |
| (b) 94 milligrams of a mixture consisting of salicylic acid, citric acid and phosphoric acid (1:1:1 by weight) | 88 | 70 | 72 | 75 | 305 |
| (c) 94 milligrams of a mixture consisting of hydroxyisophthalic acid (HIP), oxalic acid and phosphoric acid (1:1:1 by weight) | 95 | 80 | 80 | 82 | 337 |
| (d) 94 milligrams of a mixture consisting of hydroxyisophthalic acid (HIP), citric acid and phosphoric acid (1:1:1 by weight) | 90 | 80 | 80 | 80 | 330 |
| (e) 94 milligrams of a mixture consisting of equal parts (by weight) of oxalic acid and phosphoric acid | 89 | 72 | 75 | 75 | 311 |
| (f) 94 milligrams of a mixture consisting of equal parts (by weight) of citric acid and phosphoric acid | 87 | 70 | 70 | 75 | 302 |
| (g) 94 milligrams of salicylic acid | 80 | 40 | 60 | 10 | 190 |
| (h) 94 milligrams of oxalic acid | 80 | 50 | 50 | 70 | 250 |
| (i) 94 milligrams of citric acid | 78 | 50 | 40 | 60 | 228 |
| (j) 94 milligrams of phosphoric acid | 80 | 60 | 60 | 80 | 280 |
| (k) 47 milligrams of salicylic acid and 47 milligrams of oxalic acid | 88 | 60 | 60 | 60 | 268 |
| (l) 47 milligrams of salicylic acid and 47 milligrams of citric acid | 85 | 60 | 55 | 50 | 250 |
| (m) 47 milligrams of hydroxyisophthalic acid and 47 milligrams of oxalic acid | 92 | 70 | 70 | 65 | 297 |
| (n) 47 milligrams of hydroxyisophthalic acid and 47 milligrams of citric acid | 88 | 70 | 70 | 60 | 288 |
| (o) 94 milligrams of DL-alanine | 50 | 50 | 50 | 30 | 180 |
| (p) 94 milligrams of disalicylidene ethylenediamine | 50 | 40 | 40 | 20 | 150 |

Example 2

In a manner similar to that described in Example 1, portions of freshly distilled o-cresol were mixed with 0.01 percent by weight of stabilizer mixtures (a)–(h). The color stability expressed as percent light transmission after two hours exposure is summarized in Table II. The stabilizer mixtures (a)–(d) are according to the present invention, while stabilizers (e)–(h) are for comparative purposes.

TABLE II.—o-CRESOL STABILIZATION

| Stabilizers | Percent light transmission at 425 mμ (2 hours) | | | | |
|---|---|---|---|---|---|
| | 1<br>O₂/UV | 2<br>O₂/UV/<br>NaOH | 3<br>O₂/UV/<br>HCl | 4<br>Fe/NaOH/<br>O₂/UV | Total 1-4 |
| None (control) | 30 | 10 | 10 | 10 | 60 |
| (a) Salicylic acid+oxalic acid+H₃PO₄ | 70 | 50 | 57 | 50 | 227 |
| (b) Salicylic acid+citric acid+H₃PO₄ | 65 | 60 | 65 | 60 | 250 |
| (c) HIP+oxalic acid+H₃PO₄ | 70 | 65 | 65 | 60 | 260 |
| (d) HIP+citric acid+H₃PO₄ | 70 | 67 | 65 | 60 | 262 |
| (e) Salicylic acid | 35 | 20 | 20 | 10 | 85 |
| (f) Oxalic acid | 40 | 35 | 30 | 20 | 125 |
| (g) Citric acid | 40 | 30 | 30 | 20 | 120 |
| (h) H₃PO₄ | 42 | 35 | 35 | 30 | 142 |

Example 3

In a manner similar to that described in Example 1, portions of freshly distilled chlorophenol were mixed with (0.01 percent by weight) of stabilizer mixture (a)–(h). The color stability expressed as percent light transmission is shown in Table III. Mixtures (a)–(d) are in accordance with the present invention, while stabilizers (e)-(h) are for comparative purposes.

TABLE III.—o-CHLOROPHENOL STABILIZATION

| Stabilizers | Percent light transmission at 425 mμ (6 hours) | | | | |
|---|---|---|---|---|---|
| | 1<br>O₂/UV | 2<br>O₂/UV/<br>NaOH | 3<br>O₂/UV/<br>HCl | 4<br>Fe/NaOH/<br>O₂/UV | Total 1-4 |
| None (control) | 35 | 30 | 30 | 20 | 115 |
| (a) Salicylic acid+oxalic acid+H₃PO₄ | 75 | 60 | 60 | 60 | 255 |
| (b) Salicylic acid+citric acid+H₃PO₄ | 70 | 55 | 65 | 60 | 250 |
| (c) HIP+oxalic acid+H₃PO₄ | 75 | 65 | 70 | 62 | 272 |
| (d) HIP+citric acid+H₃PO₄ | 75 | 62 | 65 | 62 | 264 |
| (e) Salicylic acid | 40 | 40 | 42 | 20 | 142 |
| (f) Oxalic acid | 45 | 40 | 42 | 35 | 162 |
| (g) Citric acid | 40 | 35 | 40 | 40 | 155 |
| (h) H₃PO₄ | 50 | 40 | 45 | 45 | 180 |

Those skilled in the art will see modifications which can be made without departing from the scope of the invention. For instance, other stabilizer materials can also be added. The invention described herein is not to be limited except as defined in the appended claims.

We claim:
1. A phenol containing a mixture of a polybasic acid of phosphorus selected from the group consisting of phosphoric acid, orthophosphoric acid, metaphosphoric acid, pyrophosphoric acid, hypophosphoric acid, polyphosphoric acids, primary phosphoric acids of the formula

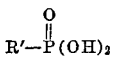

in which R' is an organic radical having from one to twelve carbon atoms linked to the phosphorus atom by a direct carbon-to-phosphorus bond, and mixtures thereof, and an organic acid selected from the group consisting of aromatic orthohydroxycarboxylic acids of the formula

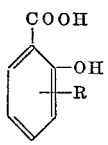

where R is selected from the group consisting of hydrogen, alkyl of one to five carbon atoms, and carboxyl groups; saturated aliphatic polycarboxylic acids containing from two to ten carbon atoms and unsubstituted except in that they have from two to three carboxyl groups and may also contain one or more hydroxyl substituents; and mixtures thereof, each acid in the combination of said acids present being in a stabilizing proportion, said phenol being selected from the group consisting of phenol, unsubstituted polyhydric monocyclic phenols, unsubstituted fused ring phenol, unsubstituted alkylidene linked bisphenols, their lower alkyl derivatives and their halogenated derivatives.

2. A phenol of claim 1 wherein the mixture is present in an amount between about 0.001 percent and about 0.5 percent by weight.

3. A phenol of claim 1 wherein the mixture is present in an amount of between about 0.002 percent to about 0.02 percent by weight of the phenol.

4. A phenol of claim 1 stabilized with a mixture of phosphoric acid, hydroxyisophthalic acid and oxalic acid.

5. A phenol of claim 1 stabilized with a mixture of phosphoric acid, hydroxyisophthalic acid and citric acid.

6. Phenol ($C_6H_5OH$) in accordance with claim 1.

7. Phenol ($C_6H_5OH$) in accordance with claim 1 stabilized with a mixture of phosphoric acid, hydroxyisophthalic acid and oxalic acid.

8. Phenol ($C_6H_5OH$) in accordance with claim 1 stabilized with a mixture of phosphoric acid, hydroxyisophthalic acid and citric acid.

9. Phenol ($C_6H_5OH$) in accordance with claim 1 stabilized with a mixture of phosphoric acid, salicyclic acid and oxalic acid.

10. Phenol ($C_6H_5OH$) in accordance with claim 1 stabilized with a mixture of phosphoric acid and oxalic acid.

11. Phenol ($C_6H_5OH$) in accordance with claim 1 stabilized with a mixture of phosphoric acid and citric acid.

12. A stabilized phenol according to claim 1 wherein the phenol is o-cresol.

13. A stabilized phenol according to claim 1 wherein the phenol is o-chlorophenol.

References Cited

UNITED STATES PATENTS

| | | |
|---|---|---|
| 2,672,485 | 3/1954 | Menn et al. |
| 2,727,928 | 12/1955 | Menn et al. |
| 2,752,398 | 6/1956 | Riley. |
| 2,829,176 | 4/1958 | Clough. |

LEON ZITVER, *Primary Examiner.*

H. ROBERTS, *Assistant Examiner.*